UNITED STATES PATENT OFFICE.

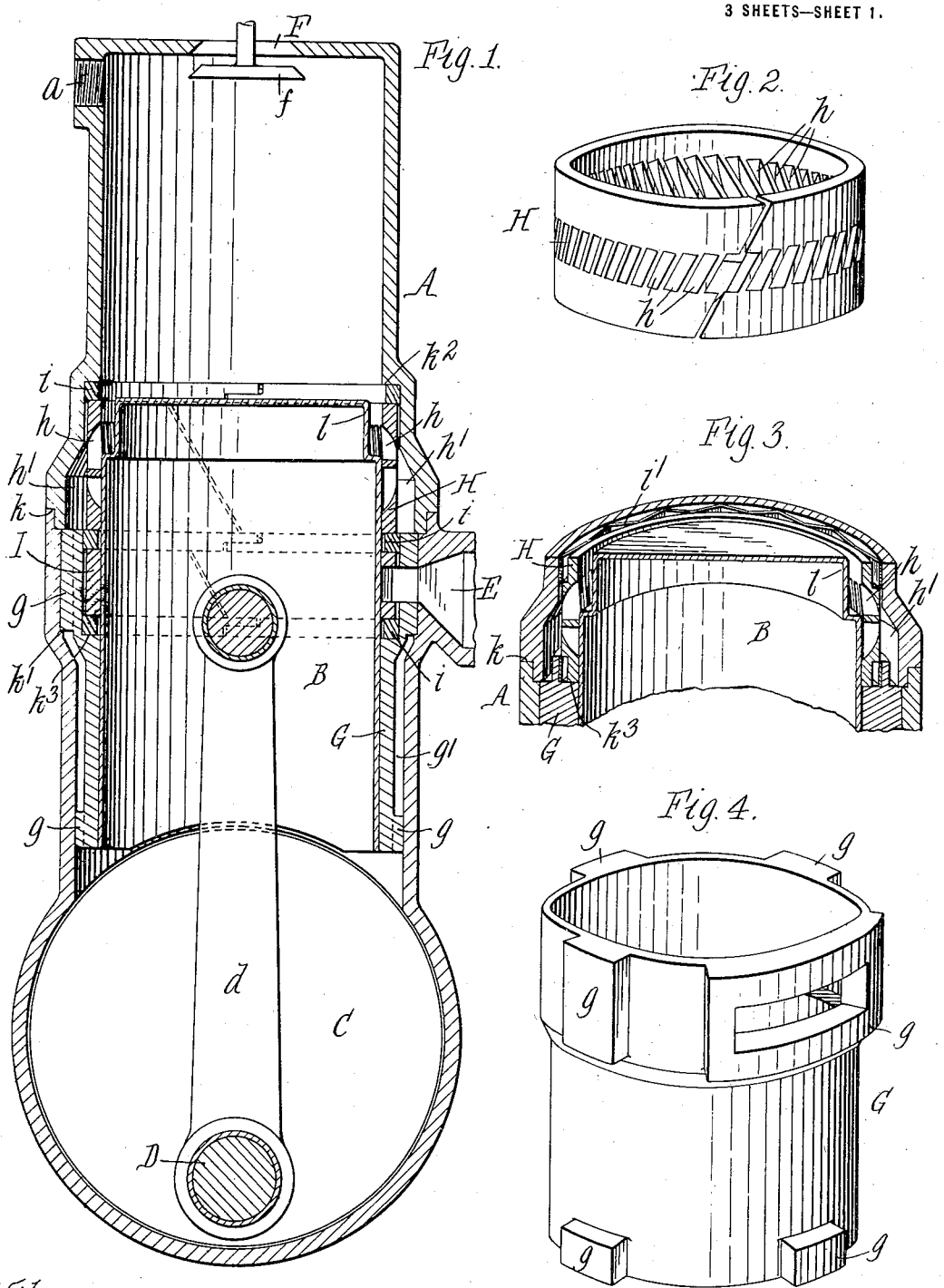

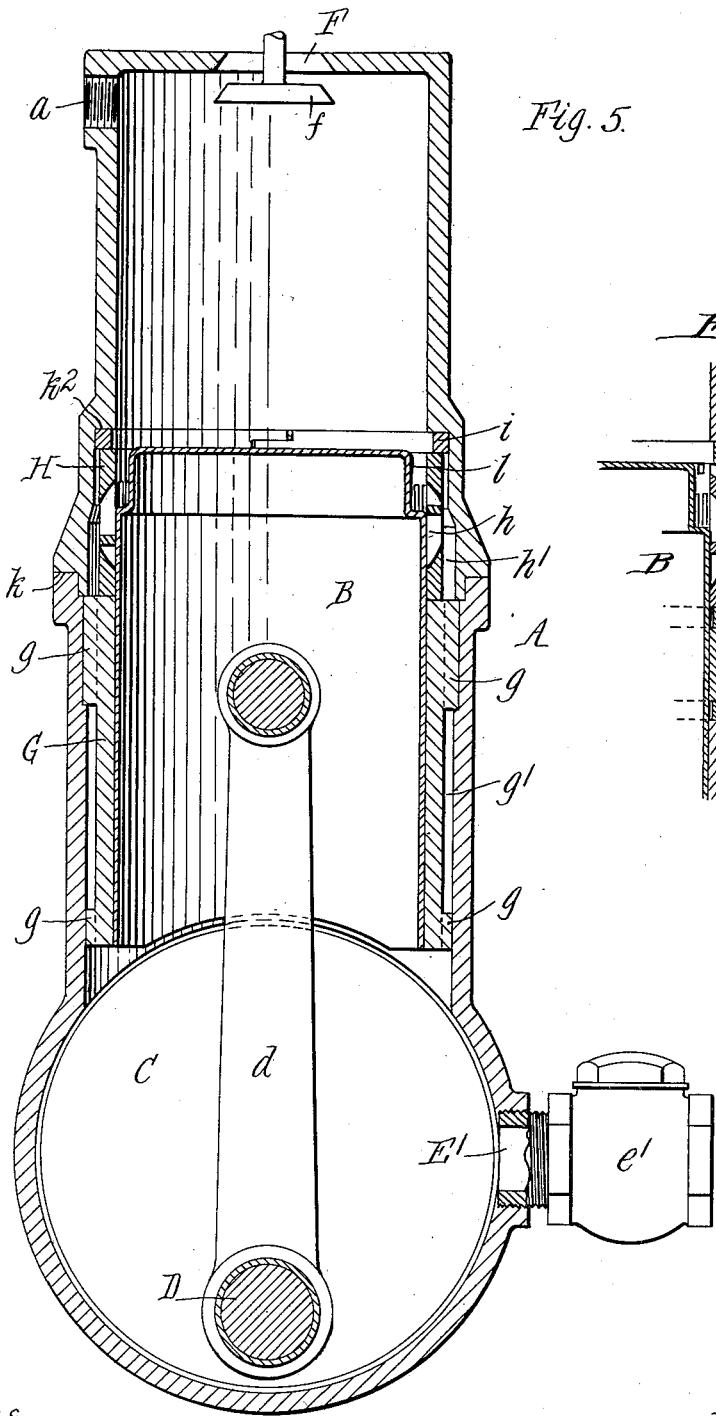

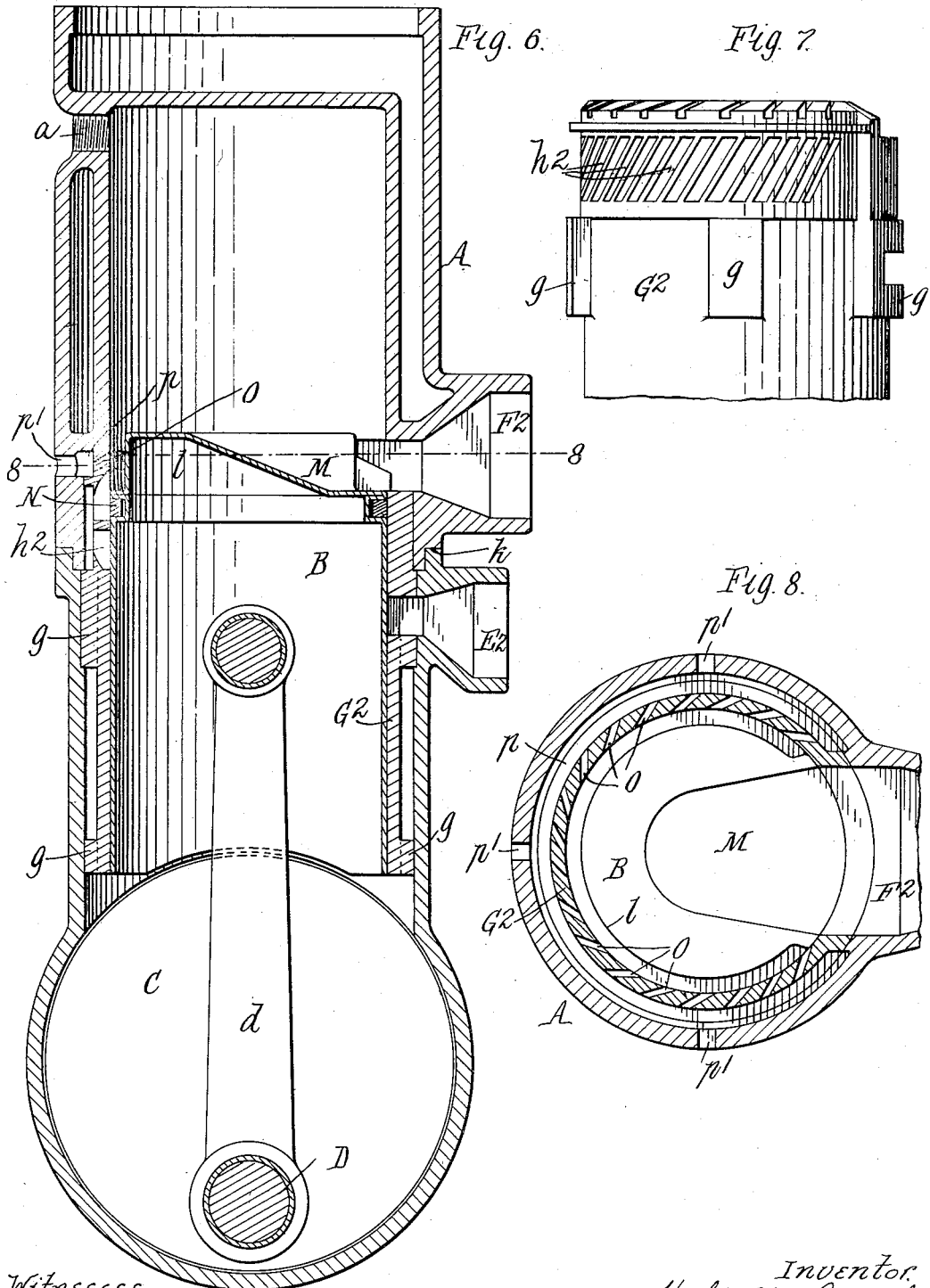

HERBERT McCORNACK, OF WEST CHESTER, PENNSYLVANIA.

INTERNAL-COMBUSTION ENGINE.

1,172,473. Specification of Letters Patent. Patented Feb. 22, 1916.

Application filed November 18, 1910. Serial No. 593,074.

*To all whom it may concern:*

Be it known that I, HERBERT MCCORNACK, a citizen of the United States, residing at West Chester, in the county of Chester and State of Pennsylvania, have invented a new and useful Improvement in Internal-Combustion Engines, of which the following is a specification.

This invention relates to that type of internal combustion engines, commonly termed two-cycle engines, in which a charge of gaseous fuel is exploded in the cylinder for every two strokes of the piston, and more particularly to engines of this type in which the fresh charge of fuel is admitted to the cylinder during the last portion of the power stroke of the piston, shortly after the exhaust is opened so that the incoming fresh fuel acts to drive the burnt gases out of the cylinder.

One of the objects of the invention is to provide an efficient engine of this sort of practical construction, in which the cylinder is provided with fuel admission ports arranged so as to produce a rotation or whirling motion of the incoming gaseous fuel in the cylinder to insure a more thorough scavenging of the cylinder; also to construct the engine so as to prevent leakage between the ports and enable the use of packing rings in the cylinder instead of on the piston in order to reduce the weight of the piston to the minimum and thereby lessen the inertia and friction thereof; and also to provide means for introducing air into the cylinder in advance of the introduction of the fresh fuel and causing it to rotate in the cylinder to cool the cylinder and aid in scavenging it.

In the accompanying drawings, consisting of three sheets: Figure 1 is a longitudinal sectional elevation of an engine embodying the invention. Fig. 2 is a detached perspective of the port ring. Fig. 3 is a fragmentary sectional perspective view of the engine showing supplemental contracting springs for the port ring. Fig. 4 is a detached perspective view of the cylinder sleeve or lining. Fig. 5 is a longitudinal sectional elevation of a modified construction. Fig. 6 is a longitudinal sectional elevation of another modification. Fig. 7 is a detached fragmentary elevation of the cylinder sleeve employed in the engine shown in Fig. 6. Fig. 8 is a transverse section in line 8—8, Fig. 6. Fig. 9 is a fragmentary sectional elevation illustrating the application of air admission passages such as shown in Figs. 6–8 to the construction illustrated in Fig. 1.

Like reference characters refer to like parts in the several figures.

The drawings represent upright engines embodying the invention, three slightly different constructions being illustrated.

In the embodiment of the invention shown in Figs. 1–4, A represents the cylinder, which is provided with a hole *a* for a spark plug or igniter. B represents the piston, C the compression or crank chamber in which the charge of gaseous fuel is compressed before being admitted to the cylinder, and D the crank shaft which rotates in the compression or crank chamber and is connected to the piston by a pitman or rod *d*. E represents a fuel supply port which is arranged in the lower portion of the cylinder at one side thereof and is controlled by the piston. When the latter nears the end of its upward or return stroke it uncovers this port E and a charge of fuel is admitted to the compression chamber and is compressed by the piston during its next, or power, stroke. F represents the exhaust port which is arranged axially at the upper end of the cylinder and is controlled by a valve *f* which is actuated by any suitable mechanism (not shown). G represents a sleeve or lining which surrounds the piston in the lower portion of the cylinder, which is recessed to receive the sleeve, and H represents a port ring which surrounds the piston in the recessed portion of the cylinder at the upper end of the sleeve G. The sleeve G is provided with laterally projecting lugs *g* which hold the sleeve away from the inner surface of the cylinder A, thus forming a space or passage *g'* in the cylinder around the sleeve, and the ring H is provided with a series of admission ports *h* which connect the space *h'* surrounding the ring with the interior of the cylinder. The spaces *g'* and *h'* and the ports *h* form admission passages connecting the compression chamber C with the explosion chamber, or portion of the cylinder above the piston, and when the piston nears the end of its power stroke and uncovers the admission ports *h* the charge compressed in the compression chamber C rushes into the cylinder. The admission ports *h* are conveniently formed by narrow slots milled in the port ring H and they preferably extend tangentially, obliquely or at an angle to radial planes passing through them, so that the gaseous fuel issuing from these ports is caused to whirl or rotate in the cylinder. The whirling gas is caused by centrifugal force to hug the walls of the cylinder and this rotating body of fresh fuel crowds the burnt gases inwardly toward the axial portion of the cylinder and drives them out through the exhaust port F. I represents a port ring which surrounds the piston in an internal recess in the upper end of the sleeve G below the port ring H, and $i$ $i$ $i$ represent split packing rings arranged between and at the opposite far ends of the port rings H and I. The port ring I is located opposite the fuel supply port E and this port is continued through the sleeve G and the ring I by openings in these parts registering with the port E in the wall of the cylinder. The port rings H and I are split and their inner peripheries fit the piston with a spring tension, while the outer peripheries of the packing rings $i$ fit with a spring tension in the surrounding cylinder and sleeve G. The elasticity of the port rings H and I can be relied on to contract them on the piston, or, if preferred, supplemental spring bands $i'$, such as shown in Fig. 3, can be employed for this purpose. This arrangement of the rings H, I and $i$ recessed in the walls of the cylinder is made possible by forming the cylinder A of two parts, which are joined at $k$ at a point between the ends of the cylinder permitting the insertion of the rings. The sleeve G is held from movement in the cylinder by its lugs $g$ being clamped between the end of the upper cylinder part and an internal shoulder $k'$ in the lower cylinder part, and the port and packing rings are confined between a shoulder $k^2$ in the upper cylinder part and a shoulder $k^3$ in the sleeve G. The rings thus arranged in the cylinder effectively pack the piston, preventing all leakage between the ports. As the piston does not carry any packing rings it can be made with thin straight walls and is therefore of the minimum weight. The piston is preferably drawn into shape from sheet metal and has a reduced upper end or head, the peripheral wall $l$ of which assists in deflecting the incoming gaseous fuel outwardly against the walls of the cylinder.

In the position of the parts represented in Fig. 1, the piston is at the end of the power stroke, the admission ports $h$ and the exhaust port F are open and the fuel supply port E is closed. As the piston moves upwardly the exhaust valve $f$ is closed and the piston closes the admission ports $h$, compressing the charge of fuel in the cylinder, and as the piston nears the end of the upward or return stroke its lower end uncovers the fuel supply port E, admitting fuel to the compression chamber C. When the charge is ignited, the force of the explosion drives the piston downwardly, the piston closing the fuel supply port and compressing the charge in the compression chamber. Toward the end of the power stroke the exhaust valve $f$ is opened, reducing the pressure in the cylinder, and the piston uncovers the admission ports $h$ and the fresh fuel rushes from the compression chamber into the cylinder, rotating in the same and driving the burnt gases out through the exhaust port F, as before explained. The whirling motion of the fresh fuel and the greater density thereof tend to keep the same separate from the lighter burnt gases, which form a diminishing and finally disappearing central or core portion in the body of gases in the cylinder. In this way the cylinder is quickly and thoroughly scavenged or cleared of the burnt gases.

The construction and operation of the engine shown in Fig. 5 is substantially as above described except that the fuel is supplied directly to the compression chamber C through a port E' controlled by a check valve $e'$ instead of by the piston-controlled port E. In this construction there is no necessity for the ported ring I, as there is no fuel supply port in the cylinder, and this ring is omitted, and only one of the packing rings $i$ is required.

In the embodiment of the invention illustrated in Figs. 6–8, as in the engine first described, the fuel supply port $E^2$ is arranged in the lower portion of the cylinder and is controlled by the piston and the charge passes from the compression chamber to the explosion chamber through the space surrounding the sleeve $G^2$ and through oblique or tangential admission ports $h^2$ for causing the charge to rotate in the cylinder. In this construction, however, the tangential ports are formed in the sleeve $G^2$ instead of in a separate port ring, and the exhaust port $F^2$ passes through the side of the cylinder and is also controlled by the piston, which is provided with a depression or channel M in its upper end or head extending from the axial portion to the side thereof and adapted to register with the exhaust port $F^2$ for the escape of the burnt gases from the axial portion of the cylinder. The piston uncovers the exhaust port toward the end of the power stroke before the admission ports are uncovered to admit the fresh charge. A packing ring N is carried by the piston in place of the packing and port rings in the cylinder used in the other constructions described. Means are provided in this engine for introducing air into the cylinder after the exhaust port is opened and before the introduction of the fresh fuel, for scavenging the cylinder and cooling it. This is accomplished by taking advantage of the partial vacuum which is produced in the explosion chamber by the escape of the discharging gases, and which, under favorable conditions, occurs just before the inflow of the fresh charge. This partial vacuum is utilized to introduce fresh air into the combustion chamber through inlet openings O in the cylinder arranged to be uncovered by the piston just before it uncovers the fuel admission ports $h^2$. As shown, these air inlets O are formed by oblique or tangential slots milled in the upper end of the sleeve $G^2$ which abuts against the upper end of the recess in the cylinder in which the sleeve $G^2$ is located. The air inlets communicate with the outside air through a chamber $p$ and holes $p'$ in the walls of the cylinder. As the air is delivered tangentially by the openings O against the deflecting wall of the reduced head of the piston, the cool air is caused to sweep the inner surface of the cylinder immediately upon the discharge of the hot burnt gases. The introduction of the air into the cylinder in this way serves not only to scavenge the cylinder but also to absorb and conduct away some of its heat, which would otherwise be radiated through its walls, thus contributing directly to the cooling of the engine. This arrangement for introducing air to cool and scavenge the cylinder is not confined to the construction of the engine shown in Figs. 6–8, but can be employed in engines of other constructions, for instance, such as illustrated in the other figures of the drawings.

Fig. 9 shows an application of the air inlets to a construction such as illustrated in Fig. 1. O' indicates the air inlet passages formed in the end of the ring H, and $p^2$ $p^3$ indicate respectively the chamber and hole by means of which the inlet passages O' communicate with the outside air.

No claims are made broadly in this application to the admission or transfer passages in the wall of the cylinder arranged angularly to the direction of the length of the cylinder to cause the charge to rotate and being controlled by the piston, this construction forming the subject matter of claims in my co-pending application Serial No. 593,073, filed of even date herewith.

I claim as my invention:

1. In a two-cycle internal combustion engine, the combination of a cylinder having a compression chamber, a piston, a sleeve in the cylinder surrounding the piston, and a ring in the cylinder which fits the piston with a spring tension and is provided with admission ports, a space being formed in the cylinder outside of said sleeve and ring which connects said compression chamber with said admission ports, substantially as set forth.

2. In a two-cycle internal combustion engine, the combination of a cylinder having a compression chamber, a piston, a sleeve in the cylinder surrounding the piston, a port ring which fits the piston with a spring tension and is provided with admission ports, a space being formed in the cylinder outside of said sleeve and ring which connects said compression chamber with said admission ports, and a packing ring which fits with a spring tension in the cylinder and bears against said port ring, substantially as set forth.

3. In a two-cycle internal combustion engine, the combination of a cylinder having a compression chamber, a piston, a sleeve and port rings in the cylinder surrounding the piston, said port rings fitting the piston and one ring being provided with admission ports and the other with a port connecting with a fuel supply port in the wall of the cylinder, and packing rings fitting in the cylinder in contact with said port rings, a space being formed in the cylinder outside of said sleeve and port rings which connects said compression chamber with said admission ports, substantially as set forth.

4. In a two-cycle internal combustion engine, the combination of a cylinder having a compression chamber, a piston, and a sleeve and port ring in the cylinder surrounding the piston, said port ring being stationary and fitting the piston and being provided with an admission port, a space being formed in the cylinder outside of said sleeve and port ring which connects said compression chamber with said admission port, and said cylinder being composed of parts which are joined between the ends of the cylinder adjacent to said port ring and sleeve, substantially as set forth.

5. In a two-cycle internal combustion engine, the combination of a cylinder, a piston, a port ring through which the piston slides and which is fixed in a recess in the cylinder between the ends thereof and is provided with tangential admission ports for causing the charge to rotate in the cylinder, the cylinder being composed of parts which are joined at said recess for the port ring, substantially as set forth.

6. In a two-cycle internal combustion engine, the combination of a cylinder, and a piston, said engine having fuel admission ports which are opened by the piston during the last portion of the power stroke thereof, and an exhaust port which is opened in advance of said admission ports, said cylinder having air admission ports which are arranged at an angle to the direction of the length of the cylinder to cause the air to rotate in the cylinder and are uncovered by the piston after the opening of said exhaust port and before the opening of said fuel admission ports, substantially as set forth.

7. In a two-cycle internal combustion engine, the combination of a cylinder, and a piston, said engine having fuel admission ports which are opened by the piston during the last portion of the power stroke thereof, and an exhaust port which is opened by the piston in advance of said fuel admission ports, said cylinder having air admission ports which are arranged at an angle to the direction of the length of the cylinder to cause the air to rotate in the cylinder and are uncovered by the piston after the opening of said exhaust port and before the opening of said admission ports, and said piston having a reduced portion with a wall which deflects the incoming air against the walls of the cylinder, substantially as set forth.

8. In a two-cycle internal combustion engine, the combination of a cylinder, a piston, a separate part in the cylinder surrounding the piston and provided with an admission port arranged at an angle to the direction of the length of the cylinder to cause the charge to rotate in the cylinder, the cylinder having a supply passage connecting with said admission port, and an exhaust port connecting with the axial portion of the cylinder which is opened when the piston nears the end of the power stroke, substantially as set forth.

Witness my hand in the presence of two subscribing witnesses.

HERBERT McCORNACK.

Witnesses:
 KATIE T. O'BRIEN,
 F. M. HOLIDAY.